(12) United States Patent
Rousseau

(10) Patent No.: US 9,945,949 B2
(45) Date of Patent: Apr. 17, 2018

(54) LONG-RANGE, SMALL TARGET RANGEFINDING

(71) Applicant: THALES, Courbevoie (FR)

(72) Inventor: Pascal Rousseau, Viroflay (FR)

(73) Assignee: THALES, Courbevoie (FR)

( * ) Notice: Subject to any disclaimer, the term of this patent is extended or adjusted under 35 U.S.C. 154(b) by 358 days.

(21) Appl. No.: 14/436,766

(22) PCT Filed: Oct. 18, 2013

(86) PCT No.: PCT/EP2013/071895
§ 371 (c)(1),
(2) Date: Aug. 17, 2015

(87) PCT Pub. No.: WO2014/060599
PCT Pub. Date: Apr. 24, 2014

(65) Prior Publication Data
US 2016/0011313 A1    Jan. 14, 2016

(30) Foreign Application Priority Data

Oct. 18, 2012  (FR) .................................... 12 02785

(51) Int. Cl.
*G01C 3/08* (2006.01)
*G01S 17/66* (2006.01)
(Continued)

(52) U.S. Cl.
CPC .............. *G01S 17/66* (2013.01); *G01S 7/487* (2013.01); *G01S 7/4816* (2013.01); *G01S 7/4873* (2013.01); *G01S 7/4876* (2013.01)

(58) Field of Classification Search
CPC ........ G01S 17/66; G01S 7/4816; G01S 7/487; G01S 7/4873; G01S 7/4876
See application file for complete search history.

(56) References Cited

U.S. PATENT DOCUMENTS

| 4,830,485 A | 5/1989 | Penney et al. |
| 6,323,941 B1 | 11/2001 | Evans et al. |
(Continued)

FOREIGN PATENT DOCUMENTS

| GB | 2252398 A | 8/1992 |
| WO | 2010063805 A1 | 6/2010 |

*Primary Examiner* — Samantha K Abraham
(74) *Attorney, Agent, or Firm* — Baker & Hostetler LLP

(57) ABSTRACT

A device for measuring a distance of a target by means of a telemeter comprises: a laser pulse emitter; a receiver of the laser echoes backscattered by the target, comprising, a spatial detection device which comprises at least one photodiode set up as integrator and is able to provide a spatial signal, and a temporal detection device which comprises at least one photodiode coupled to a transimpedance circuit and is able to provide a so-called temporal signal, means of processing of the spatial signal and of the temporal signal, comprising a unit for calculating the distance of the target, the temporal signal being in the form of a data frame which is the recording of data detected over a predetermined duration. The means of processing comprise: means of post-integration of temporal signals, linked at output to the unit for calculating the distance of the target, linked to the spatial detection device and to the temporal detection device, means for selecting the temporal signals to be transmitted to the post-integration means, as a function of the spatial signal.

26 Claims, 7 Drawing Sheets

Figure 1A:
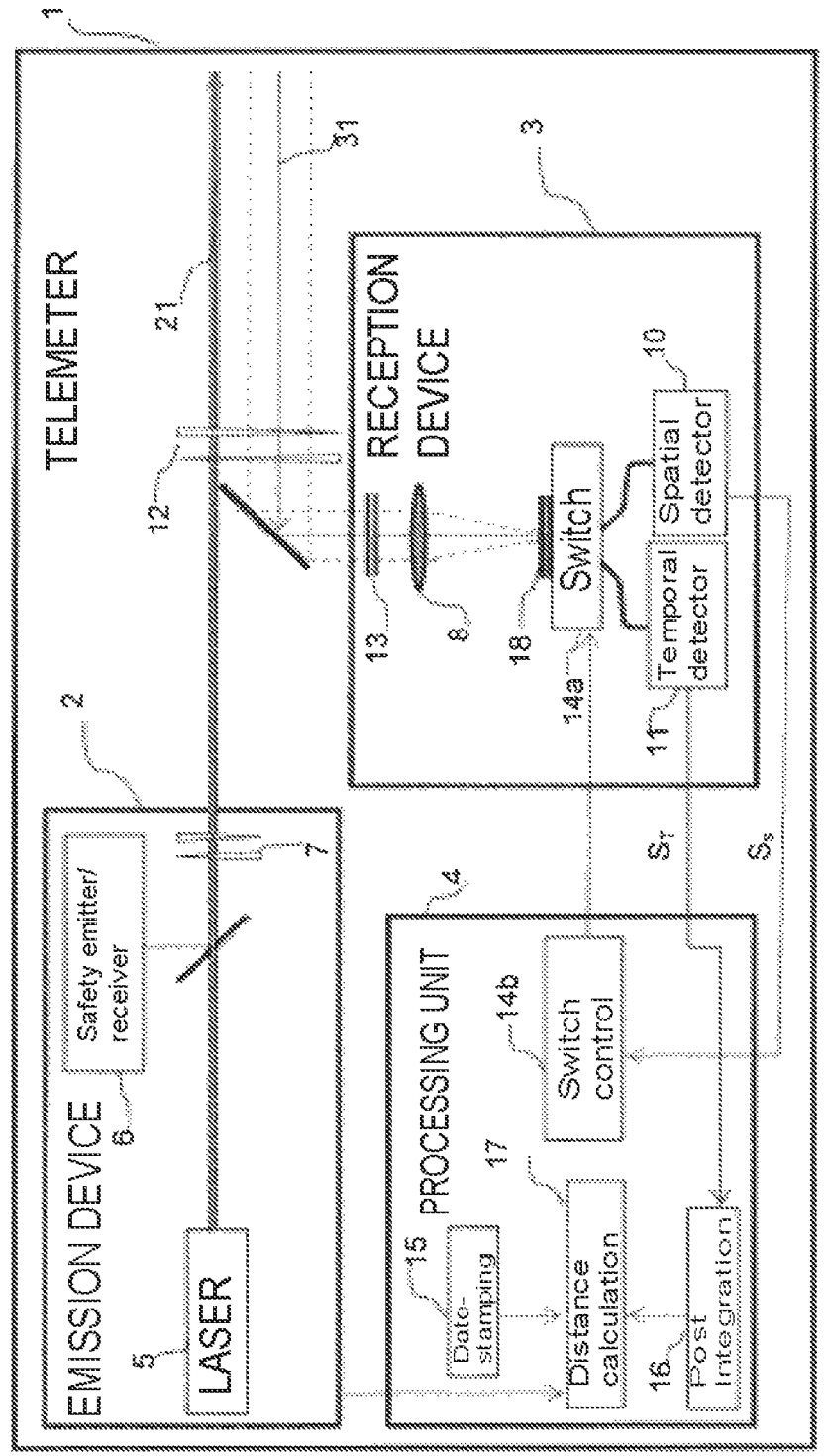

(51) Int. Cl.
*G01S 7/481* (2006.01)
*G01S 7/487* (2006.01)

(56) References Cited

U.S. PATENT DOCUMENTS

| | | |
|---|---|---|
| 2004/0004707 A1 | 1/2004 | Deflumere |
| 2004/0021852 A1 | 2/2004 | Deflumere |
| 2006/0165417 A1* | 7/2006 | Hsieh ............... H04B 10/40 398/138 |
| 2011/0235020 A1 | 9/2011 | Rousseau |
| 2013/0070239 A1* | 3/2013 | Crawford ............ G01S 17/66 356/139.04 |

* cited by examiner

LONG-RANGE, SMALL TARGET RANGEFINDING

CROSS-REFERENCE TO RELATED APPLICATIONS

This application is a National Stage of International patent application PCT/EP2013/071895, filed on Oct. 18, 2013, which claims priority to foreign French patent application No. FR 1202785, filed on Oct. 18, 2012, the disclosures of which are incorporated by reference in their entirety.

FIELD OF THE INVENTION

The field of the invention is that of laser telemetry.

BACKGROUND

A telemeter allows the measurement of the distance between it and a target. An optical telemeter uses the propagation of light as measuring means, it is composed of an emitter and of a receiver. It emits light directed toward the target and detects a fraction of this light returned by the target. The distance is obtained on the basis of the time required for the light to propagate out to the target and for the light to return to the receiver. The emission is temporally modulated. The emitted light transports this modulation to the target. The target reflects or backscatters this light. A fraction of this returned light transports the modulation to the receiver of the telemeter. Measurement of the time elapsed between the identification of the starting modulation of the telemeter and the identification of the modulation of its return by the receiver makes it possible to calculate the distance between the telemeter and the target on the basis of the speed of propagation of light in the media traversed.

Typically, a telemeter comprises an emission device, comprising an emitter and its optic for shaping the laser beam, a reception device comprising an optic for collecting and focusing on the focal plane laser echoes backscattered by the target, and a processing device for driving the emission and reception and allowing computation of the distance.

The optical echo of the target is converted into an electrical signal by the detector, the electrical signal being superimposed on the noise. The filtered and amplified signal obtained at the end of the detection chain is digitized.

A frame consists of a series of data sampled over the duration counted from the emission of the pulse and over the time of an outbound-return journey corresponding to the maximum distance of use or over the duration corresponding to the distance sub-domain sought. The sampling frequency is chosen so as to optimize the extraction of the signal of the echo from the noise and allow the expected resolution and precision in terms of distance. For example, a sampling frequency of 59.94 MHz would allow a distance increment of 2.5 m.

Various solutions have been implemented for improving the range of a laser telemeter.

A first solution consists in increasing the energy emitted per pulse. But, the increase is limited by constraints of ocular safety and by the increase in volume and in energy consumption of the emission device.

Another solution consists in increasing the surface area of the reception pupil. This solution is, likewise, limited by telemeter bulkiness and weight constraints.

In the case where the dimensions of the target are smaller than the dimensions of the spot made by the laser at the level of the target, only the fraction of light deposited on the target contributes to the telemetry. This fraction is dependent on the quality of the laser beam determining the size of the spot, and on the way the beam is pointed toward the target.

Under ideal conditions, the laser beam is very slightly divergent and perfectly pointed toward the target, all of the emitted light contributes to the telemetry. However, the sighting line is rarely directed toward the part that is most contributory in the telemetry sense, the most contributory part being a zone which returns the largest fraction of the emission by reflection or backscattering toward the reception device. To avoid significant losses of performance, as soon as the sighting line is not directed toward the most contributory part of the target, it is necessary to increase the divergence of the beam, to the detriment of the telemeter's range.

In the case of non-cooperative targets, the laser emission is usually pulsed. A target is cooperative when the target favors the return of the light in the direction of the emitter with the aid of a cubic wedge for example.

In the case of pulsed telemetry, the signal arising from the detector is composed of the noise of the detection chain, of the optical noise collected in the reception field and of the echo of the expected target. When the signal is sufficiently significant, the detection of the moment of arrival of the echo is done by thresholding. Stated otherwise, a target is detected if the intensity of the echo is greater than a threshold fixed beforehand above the level of the noise.

The signal at the moment of the thresholding is the sum of the amplified signal coming from the detection of the echo and the optical and electronic noise. For a target, the signal will have an amplitude varying from one pulse to the next. For a signal in the vicinity of the level of the threshold, the signal will not always exceed the threshold. When the signal is below the threshold there is no detection. If a signal does not at any moment exceed the threshold, the echo is absent or too weak.

The observation can be done from the start of the pulse over a duration corresponding to the maximum distance sought, for example 533 µs for a maximum distance of 80 km. The observation can also be done over a duration corresponding to a distance sub-domain, for example over a duration corresponding to the sub-domain lying between 40 and 50 km.

Another possibility for improving the probability of target detection over a given time interval is to increase the pulse repetition rate.

To improve the detection of the echoes of the target in relation to noise, it is possible to combine the detection signals subsequent to several pulses. The combining of several detection signals can be undertaken according to a post-integration method. This procedure is old, it has been implemented with analog methods but it is still in vogue in the digital age.

Post-integration processing is a way of combining the frames of signals detected subsequent to each pulse.

For a given telemeter, the post-integration step makes it possible to improve the gains appreciably when the distance between the telemeter and the target is sufficiently stable over the duration of the measurement.

In the case where the telemeter is properly pointed at the target the probability of the presence of the echo of the target in each frame is 1. If the distance between the telemeter and the target varies little in the course of the post-integration phase, at each distance increment, the data of frames are added up. The expected signal S is added up linearly, it is therefore proportional to N, N being the number of frames, $$\sum_N S \propto N.$$

On account of its nature, the detection noise B is summed quadratically, the amplitude of the noise is proportional to the square root of the number of frames, $$\sum_N B \propto \sqrt{N}.$$

The ratio of the intensity of the expected signal to the intensity of the noise will be proportional to the square root of the number of frames, $$\frac{\Sigma_N S}{\Sigma_N B} \propto \sqrt{N}.$$

Stated otherwise, for a post-integration step on N frames having a probability of presence of the echo of the target in a frame of 1, the ratio of the intensity of the signal to the intensity of the noise S/B is proportional to $\sqrt{N}$.

During a difficult pursuit of a mobile target, notably when the dimensions of the target are smaller than the dimensions of the spot of the laser at the level of the target, certain frames do not contain any information relating to the presence of an echo of the target. The post-integration applied to all the frames does not have the expected effectiveness. Frames which contain only noise are thus added to the frames which also contain an echo of the target. The probability of an echo of the target in a frame therefore directly affects the gain expected by the post-integration step.

When the probability of presence of the target on the spot of the laser at its level is 1/a, that is to say only one frame out of a frames comprises an echo of the target, the ratio of the intensity of the signal to the intensity of the noise S/B is proportional to $$\frac{\sqrt{N}}{a}.$$

Therefore $a^2 \cdot N$ frames are necessary for the same ratio of the intensity of the signal to the intensity of the noise $\sqrt{N}$ as that obtained in n frames when the probability of presence of the echo is 1. To obtain for example a gain of 10($\sqrt{N}$=10) subsequent to the post-integration step, this requires the summation of 100 frames. If the probability of presence of the echo of the target in a frame is ½ then a gain of 10 will be obtained by summing $2^2 \cdot 100 = 400$ frames.

An aim of the invention is to improve the performance of a telemeter using a step of post-integration, using the invention previously described in patent application EP 2364455. This patent application EP 2364455 proposes a telemetry reception device capable of detecting temporally and spatially the echo provided by the target illuminated by the laser pulse.

The temporal detection allows the distance to be measured by measuring the time of flight of the pulse, it can be done by means of one or more detectors.

The spatial detection can be obtained by means of one or more detectors. This detection, on the basis of one or more pulses, makes it possible to label the direction from which the maximum of light backscattered by the target comes or the absence of target. This maximum of light results from the interaction of the target with the spot of the laser pulse. It is thus possible to recenter the direction of emission so as to maximize the effectiveness of the telemeter.

The passband required for the temporal detection is very large in comparison to that of the spatial detection, thus increasing the noise of the temporal detection chain. Consequently, the spatial detection is much more sensitive than the temporal detection.

SUMMARY OF THE INVENTION

According to one aspect of the invention, there is proposed a device for measuring a distance of a target by means of a telemeter comprising:
 a laser pulse emitter,
 a receiver of the laser echoes backscattered by the target, comprising
 a spatial detection device which comprises at least one photodiode set up as integrator and is able to provide a so-called spatial signal, and
 a temporal detection device which comprises at least one photodiode coupled to a transimpedance circuit and is able to provide a so-called temporal signal,
 means for processing the spatial signal and the temporal signal, comprising a unit for calculating the distance of the target, the temporal signal being in the form of a data frame which is the recording of data detected over a predetermined duration.
It is principally characterized in that the processing means comprise:
 means of post-integration of temporal signals, linked at output to the unit for calculating the distance of the target,
 linked to the spatial detection device and to the temporal detection device, means for selecting the temporal signals to be transmitted to the post-integration means, as a function of the spatial signal.

Stated otherwise, the proposed telemeter comprises a laser pulse emitter, a receiver making it possible to provide spatial information and data frames, and means for processing the spatial information and data frames so as to carry out a selective post-integration of these data frames.

The telemeter according to the invention is configured to select and adapt the processing of the frames on the basis of the spatial information.

The capacity of the telemeter to detect the target spatially and to mark the frames arising from the temporal detection containing a priori an item of information relating to the presence of an echo of the target makes it possible to limit the drawbacks of the laser pulses emitted but which do not reach the target.

According to a first embodiment, the means for selecting the temporal signals comprise a switching control linked at output to the temporal detection device via a switch, and linked at input to the spatial detection device and able to switch the temporal detection device via the switch as a function of the spatial signal, and in that the post-integration means are linked at input to the temporal detection device. According to this embodiment, all the frames arising from the temporal detector are transmitted to the post-integration means, since selection has occurred upstream of the temporal detection.

According to a variant of this embodiment, the switching control is furthermore linked to the post-integration means.

According to a second embodiment, the means for selecting the temporal signals are discrimination means which are linked at input to the spatial detection device and to the temporal detection device and at output to the post-integration means. According to this embodiment, only certain frames arising from the temporal detector are transmitted to the post-integration means, since the selection occurs downstream of the temporal detection.

Advantageously, the processing unit comprises means of temporal labeling or date-stamping of the frames, thereby allowing processing by post-integration when a mobile target is detected.

Advantageously, the receiver furthermore comprises a protection flap so as to protect the receiver when no detection is necessary.

Advantageously, the telemeter furthermore comprises a device for aligning the direction of emission and the reception pathway.

Advantageously, the telemeter furthermore comprises means for detecting a presence of a target for distances smaller than the minimum telemetry distance. Depending on the telemeters, this minimum distance may be from 50 to 500 m. These detecting means make it possible to deactivate the operation of the laser emission and to ensure the ocular safety of the device from the zero distance.

Advantageously, the laser emitter comprises means for adapting the divergence and for collimating the laser beam at infinity.

Advantageously, the telemeter furthermore comprises means for orienting the telemetry axis.

Advantageously, the telemeter comprises means for measuring deviometry between the telemetry axis and the position of the target, the measuring means being connected to the spatial detector.

The telemetry axis orienting means associated with the deviometry measurement allow pursuit of the mobile target.

Advantageously, the telemeter has the capacity for pursuit of the target, on the basis of the spatial detection information, by modifying the spatial arrangement of the spatial and temporal detectors, in accordance with the invention previously described in patent application EP 2364455.

According to another aspect of the invention, there is proposed a method for measuring the distance of a target by means of a telemeter such as described previously and comprising:
  a spatial detection step comprising a sub-step of emission of a laser pulse by the emission device, a sub-step of detecting the spatial signal $S_S$ and of acquiring a value I of integration of $S_S$,
  a temporal detection step comprising a sub-step of emission of laser pulses by the emission device, and a sub-step of acquiring a temporal signal $S_T$ in the form of data frames,
  a step of post-integration of the data frames $S_T$ as a function of the spatial signal $S_S$,
  when the result of the post-integration is above a threshold, a step of calculating the distance.

According to a first mode of operation of the invention, the spatial detection and the temporal detection are sequential and the method for measuring the distance of a target is ensured by means of a telemeter according to the first embodiment; it comprises the following sequential steps:
  a spatial detection step comprising a sub-step of emission of a laser pulse by the emission device, a sub-step of detecting the spatial signal $S_S$ corresponding to the laser echo of said pulse and of acquisition of a value I of integration of $S_S$ by the switching means, and when the value I is below a predetermined threshold S1, the previous step is repeated,
  otherwise a target then having been detected, a temporal detection step is implemented comprising a sub-step of emission of other laser pulses by the emission device, and a sub-step of acquiring a temporal signal $S_T$ in the form of data frames, corresponding to the laser echoes of these other pulses,
  a step of post-integration of the data frames $S_T$ obtained during the temporal detection step.

According to a variant to this mode of operation of the invention, the spatial detection and the temporal detection are sequential and the method for measuring the distance of a target is ensured by means of a telemeter according to the second embodiment comprises the following sequential steps:
  a step of $1^{st}$ spatial detection comprising a sub-step of emission of a laser pulse by the emission device, a sub-step of detecting the spatial signal $S_S$ corresponding to the laser echo of said pulse and of acquiring a value I of integration of $S_S$, and when the value I is below a predetermined threshold S1, the previous sub-steps are repeated,
  otherwise a target then having been detected, a temporal detection step is implemented comprising a sub-step of emission of other laser pulses by the emission device, and a sub-step of acquiring a temporal signal $S_T$ in the form of data frames termed group A of frames, corresponding to the laser echoes of these other pulses,
  a step of post-integration of this group A of data frames $S_T$ obtained during the temporal detection step,
  a temporal detection step is implemented comprising a sub-step of emission of other laser pulses by the emission device which differ from those of the group A, a sub-step of acquiring a temporal signal $S_T$ in the form of data frames termed group B of frames, corresponding to the laser echoes of these other pulses, and a sub-step of placing this group B of frames in memory,
  a step of 2nd spatial detection comprising a sub-step of emission of a laser pulse by the emission device, a sub-step of detecting the spatial signal $S_S$ corresponding to the laser echo of said pulse and of acquiring a value I of integration of $S_S$,
  when the value I is above a predetermined threshold S1 right from the first pulse, the spatial detection being confirmed, a step of post-integration of the group B of data frames is activated. The previous step of temporal detection of the group A is repeated,
  when the value I is below a predetermined threshold S1, the previous steps from the spatial detection are repeated.

According to another mode of operation of the invention, the spatial detection and the temporal detection are simultaneous and the method for measuring the distance of a target is ensured by means of a telemeter according to the third embodiment; it comprises the following steps:
  a spatial detection step comprising a sub-step of emission of a laser pulse by the emission device, a sub-step of detecting the spatial signal $S_S$ corresponding to the laser echo of said pulse and of acquisition of a value I of integration of $S_S$ by the selection means and a simultaneous sub-step of detecting a temporal signal $S_T$ corresponding to the same laser echo of said pulse,
  when the value I is below a predetermined threshold S1, the previous step is repeated, otherwise a target then having been detected, a step of post-integration of the corresponding data frames $S_T$, by the post-integration means.

These steps are repeated until the measurement of the distance between the target and the telemeter is obtained.

The method according to the invention makes it possible to weight the data frames as a function of the intensity level of the spatial signal.

Preferably, the method furthermore comprises a step of temporal labeling (or date-stamping) of the frames prior to their post-integration.

Optionally, the target to be telemetered is mobile. In this case, the steps can be repeated for various assumptions of relative speed between the target and the telemeter.

Figure 1B:
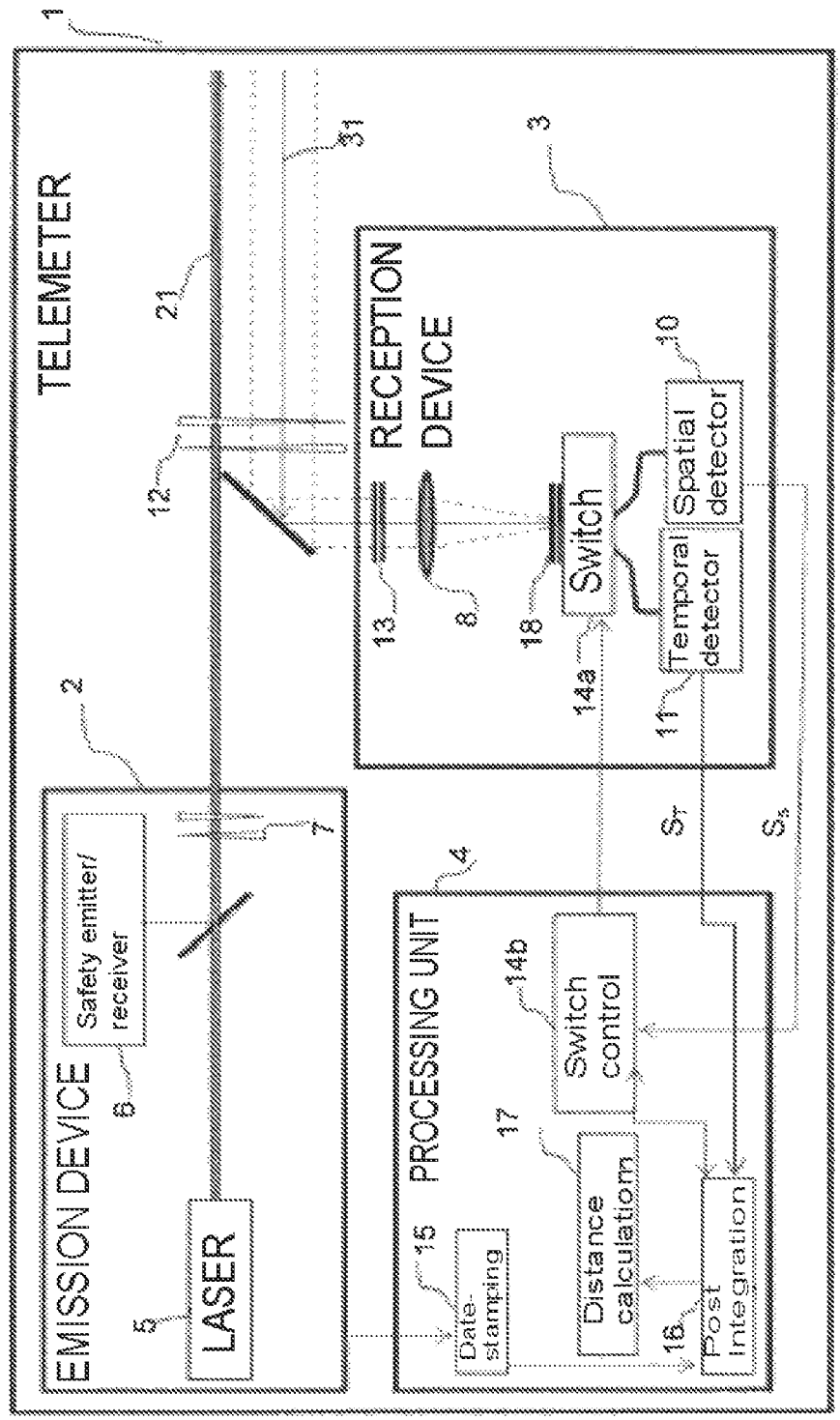
Figure 1C:
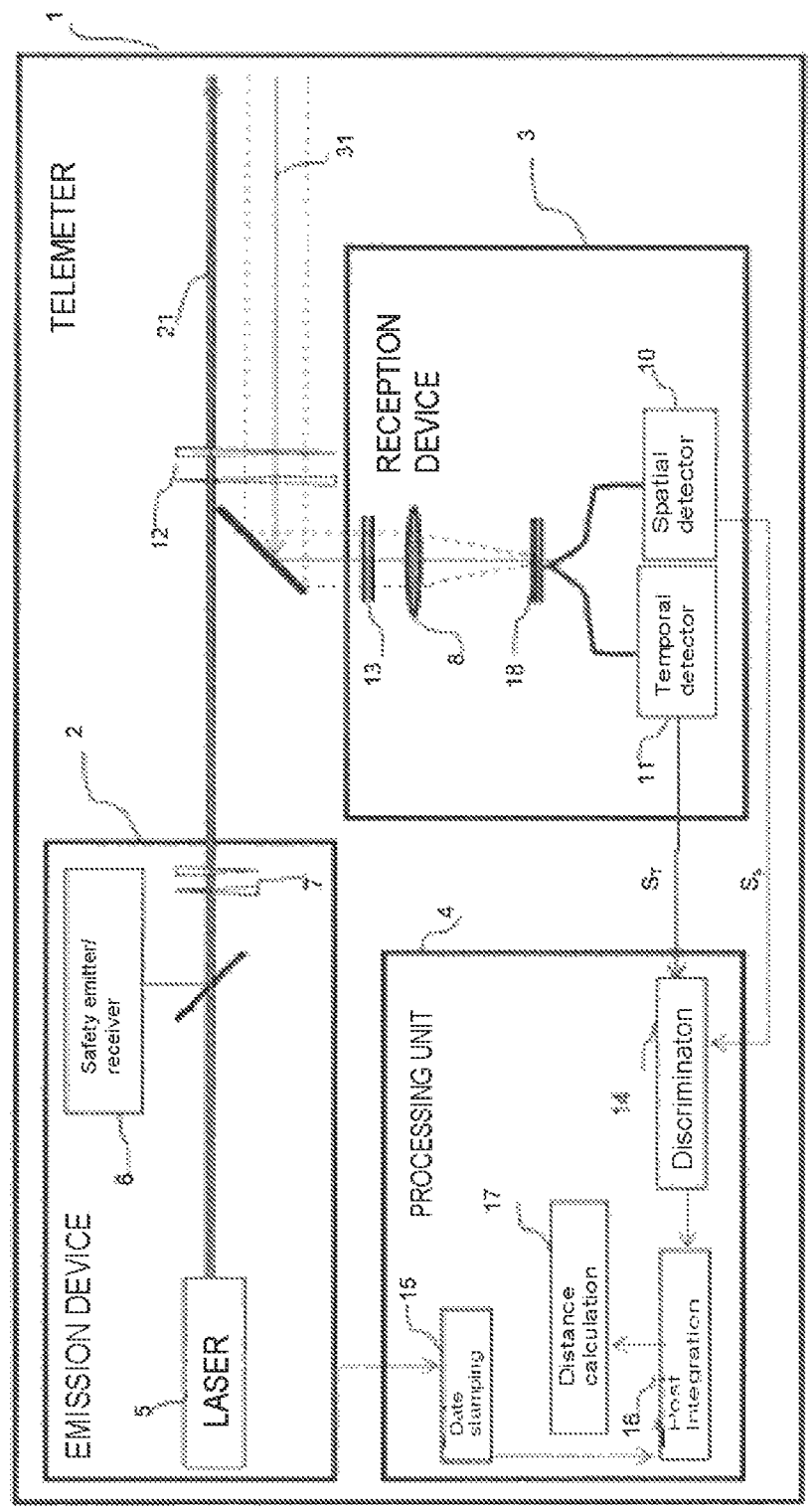
Figure 2A:
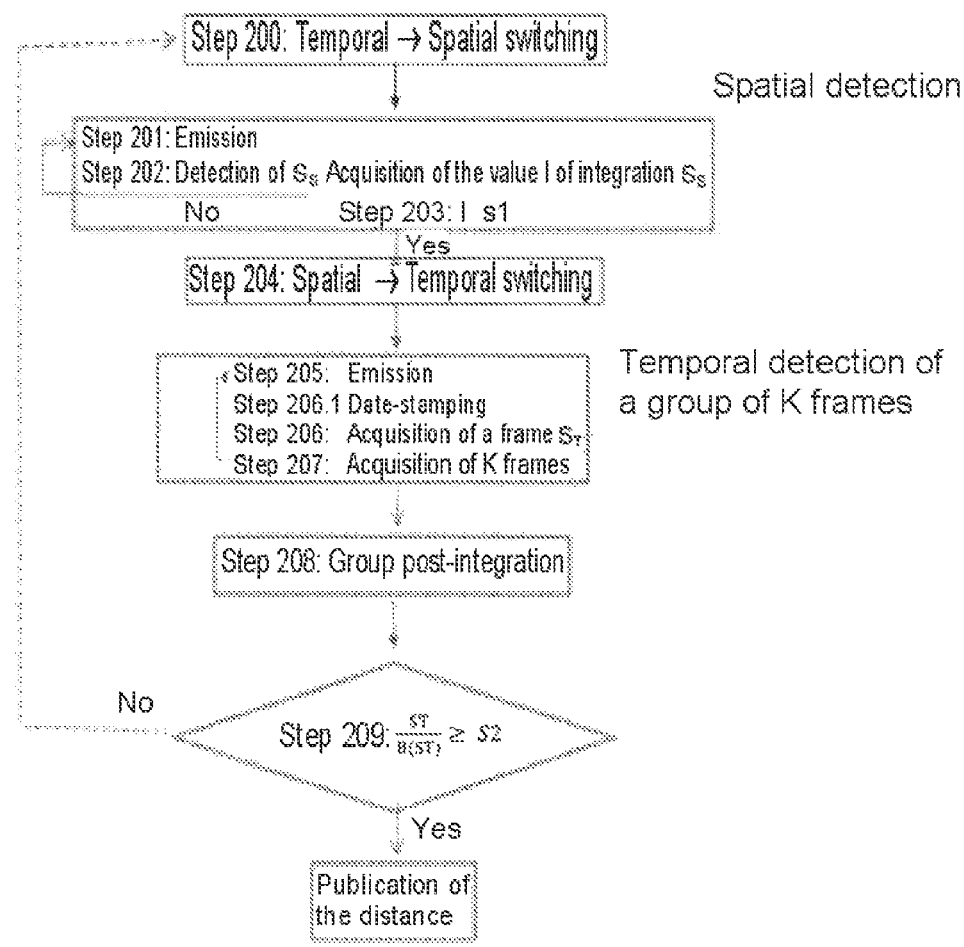
Figure 2B:
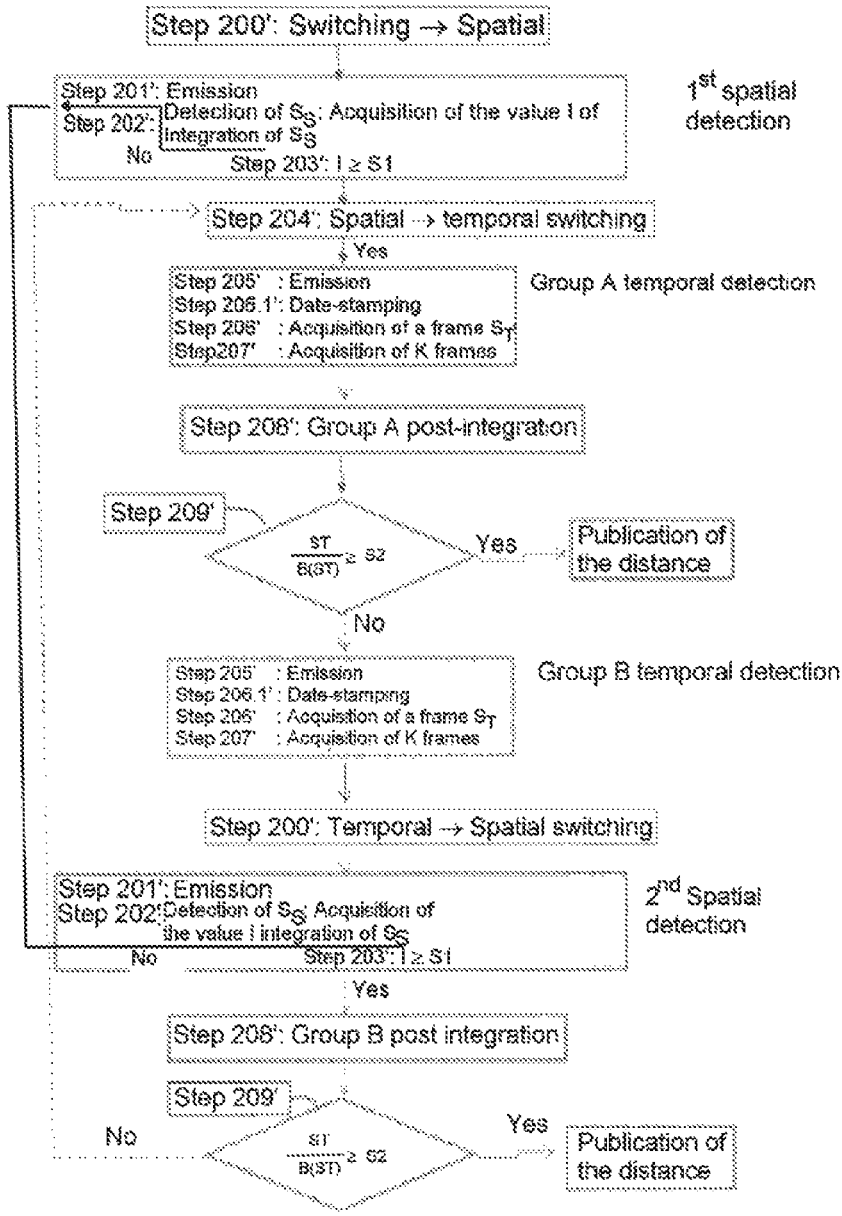
Figure 2C:
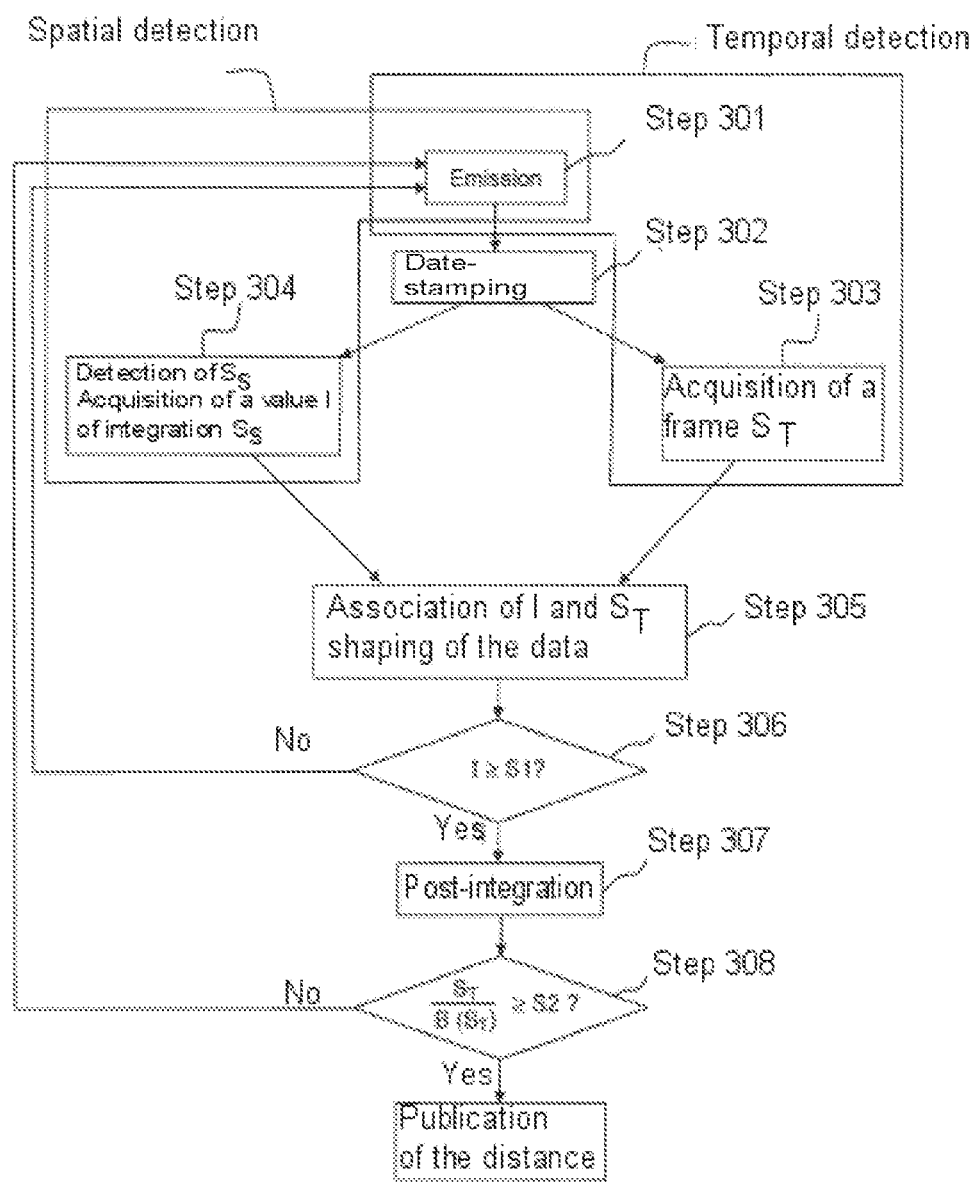
Figure 3:
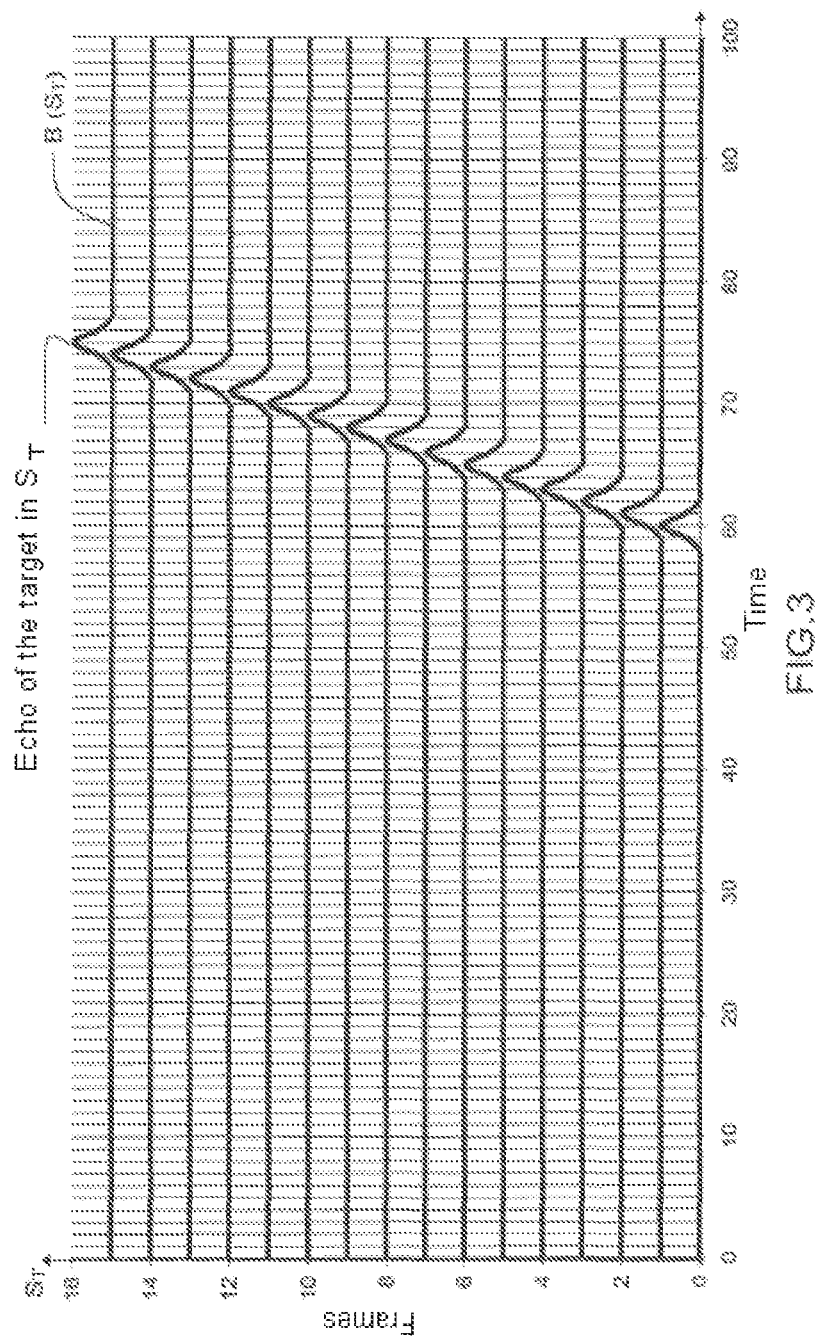

The invention will be better understood on studying a few embodiments described by way of wholly non-limiting examples, and illustrated by appended drawings in which:

FIG. 1 schematically represent examples of telemeter according to the invention, which vary according to the selection means used, FIG. 2 represent operating schematics of a telemeter according to the invention, when the spatial detection alternates with the temporal detection (FIGS. 2a and 2b), when the spatial detection is simultaneous with the temporal detection (FIG. 2c), FIG. 3 represents frames $S_T$ containing an item of information representative of the presence of the echo of a target, the relative speed of the target being constant, as a function of time.

DETAILED DESCRIPTION

The telemeter 1 represented in FIGS. 1a, 1b, and 1c, comprise an emission device 2 for emitting a laser beam 21, a reception device 3 for receiving the backscattered echoes 31 and a processing unit 4.

The device 2 for emitting a laser beam 21 comprises a laser pulse emitter 5 allowing weak divergence. Preferably, the laser pulse emitter 5 is high frequency. Advantageously, the telemeter 1 comprises a device comprising a secondary emitter/receiver 6 for safety, configured for the detection of the presence of a target situated at a distance below the minimum telemetry distance and adapted for stopping the operation of the laser emitter 5 in case of detection of a target at a distance below the minimum telemetry distance so as to ensure the ocular safety of the telemeter 1. Typically, minimum telemetry distance is intended to mean a distance lying between 0 and 500 m.

Advantageously, the emission device 2 can furthermore comprise an optic, not represented, capable of shaping the laser beam. Stated otherwise, on its exit from the emitter 5, the laser beam 21 is at the expected divergence and collimated at infinity.

Advantageously, the telemeter 1 comprises means 7 for orienting the emissions making it possible to modify the direction of emission relative to reception.

According to the invention, the telemetry of a target is performed as follows. The emission device 2 emits a pulsed laser signal 21 and optionally transmits the date of emission of the pulse 21 to the processing unit 4.

The reception device 3 for receiving the backscattered echoes 31 comprises an optic 8 which focuses the backscattered echoes 31 on a focal plane 18. As described in patent application EP 2364455, this focal plane can be subdivided into several elementary detection zones. At each elementary zone, the detection can be spatial or temporal. The reception device 3 can comprise means for steering the backscattered echoes 31 toward the spatial detector 10 or the temporal detector 11, as described in patent application EP 2364455. The spatial 10 and temporal 11 detectors can be situated in the focal plane 18, or the light can be transported from the focal plane to the detectors 10, 11 by optical means such as mirrors or optical fibers. The spatial and temporal detections can be done either by a single detector associated with two distinct reading circuits, one dedicated to spatial detection and the other to temporal detection, or by two distinct detectors, one for temporal detection and the other for spatial detection. A spatial detector 10 is typically a photodiode set up in an integrator circuit. The setup is low noise. During the integration period, the charges created are stored and then, after the integration period the reading circuit converts these charges into a signal proportional to the number of charges collected. The duration of the integration is suited to the distance domain or to the sub-domain in which the target may be situated. The detection of a very weak signal of the order of a few tens of photons is possible. A temporal detector 11 is typically a photodiode of PIN type, an avalanche photodiode or a photodiode with large passband optimized for the temporal labeling of the echoes and to allow the measurement of the distance between the target and the telemeter. Its performance is principally limited by the inherent noise of the detector and associated circuits of transimpedance and amplification type. The resolution of the temporal modulation allows precise measurement of the distance. An avalanche photodiode makes it possible to improve the ratio of the intensity of the signal to the intensity of the noise. A few hundred or indeed thousand photons are required in order to obtain a signal-to-noise ratio sufficient to limit the risks of false alarm. The level of the signal detectable by the temporal detector 11 is much higher than that detectable by the spatial detector 10.

Advantageously, the telemeter 1 comprises an orientation device 12 for orienting the telemetry axis comprising the emission pathway and the reception pathway. This device can be dynamic so as to allow fine pursuit of the target on the basis of the spatial detection deviometry information.

Advantageously, the reception device furthermore comprises a retractable protection flap 13 to protect the receiver when no detection is necessary.

Advantageously, the reception device 4 comprises means for shaping the data for their digital processing. The sampling frequency would be 59.958 MHz for a distance measurement increment of 2.5 m. However, a higher sampling frequency may be adopted for better representativity of the pulses during the processing operations.

The processing unit 4 comprises the following means:
Selection means 14 which establish the value I of integration of the spatial signal $S_S$ arising from the spatial detection and select the frames arising from the temporal detector which are to be post-integrated,
Means 16 of post-integration of the selected temporal frames,
Means 17 for calculating the distance between the target and the telemeter, on the basis of the result provided by the post-integration means.

According to a first embodiment shown in FIG. 1a, these selection means activate the spatial detection or the temporal detection, as a function of the value I of integration of $S_S$. These selection means are for example ensured by switching means allowing the steering of the backscattered echoes 31 toward the spatial detector 10 or the temporal detector 11. These switching means comprise a switching control 14b able to establish a decision as a function of I and a switch 14a able to execute this decision. The switching means 14a, 14b steer toward the spatial detector 10 during the spatial detection. When the spatial detection is ensured, the switching means 14a, 14b toggle to the position for steering toward the temporal detector 11, for the acquisition of a group of frames. According to this embodiment, all the frames of the group which arise from the temporal detector 11 are transmitted to the post-integration means 16, since selection has occurred upstream of the temporal detector.

According to a second embodiment shown in FIG. 1b, a variant of the first embodiment, the switching control 14b is furthermore linked to the post-integration means 16.

According to a third embodiment shown in FIG. 1c, the selection means are discrimination means 14 which are linked at input to the spatial detection device 10 and to the temporal detection device 11 and at output to the post-integration means 16. The two detectors, spatial and temporal, are active for all the pulses. As a function of the value I of integration of $S_S$, there is discrimination of the frame arising from the temporal detection device 11, so as to determine whether it has to be transmitted to the post-integration means 16. The apportionment is static between the spatial detection and the temporal detection. This entails for example a semi-transparent plate. According to this embodiment, only certain frames of the group which arise from the temporal detector 11 are transmitted to the post-integration means 16, since selection has occurred downstream of the temporal detector 11.

The processing unit 4 advantageously comprises means 15 of temporal labeling of the frames $S_T$, which associate with them the date-stamps of the emissions provided by the emission device 2 (steps 206.1, 302); they are situated at the output of the emission device 2 and at the input of the post-integration means 16. They may optionally be integrated into the selection means. This temporal labeling is indispensable in the case of a mobile target, as described further on, but not for a fixed target; but when it is not known a priori whether the target is fixed or mobile, this default temporal labeling is carried out.

The telemeter 1, according to one aspect of the invention, makes it possible to locate the most contributory part of the target, to finely orient the emission axis with this part and to telemeter it. It thus makes it possible to limit the waiting duration before the display of the distance of the target when laser pulses are fired alongside the target.

Several modes of operation of the telemeter 1 can be used, all based on post-integration of laser echoes which are detected by the temporal detector and are previously selected as a function of the signal arising from the spatial detector: either the spatial detection alternates with the temporal detection, optionally with a variant, or the spatial detection is simultaneous with the temporal detection.

FIG. 2a represents a mode of operation of the telemeter according to the first mode of use, when the spatial detection alternates with the temporal detection. The telemeter used is that described in conjunction with FIG. 1a.

In a first step 200, a spatial detection is activated until detection of a target for which the measurement of the distance between the target and the telemeter may be desired, this spatial detection step comprises sub-steps 201, 202 and 203. Optionally, the detection of the presence of a target situated at a distance below the minimum telemetry distance is activated, thereby making it possible to ensure the ocular safety of the device.

In a sub-step 201, a laser pulse is emitted by the emission device 2. In a sub-step 202, the spatial detection is in integration for a duration corresponding to the outbound-return journey time of the emissions in the domain or sub-domain of use of the telemeter, so as to acquire an integration value I. For example, for a target situated in a sought-after distance sub-domain lying between 40 and 50 km, the integration window will lie between 266 µs and 333 µs, the instant of emission of the pulse corresponding to time zero, the domain corresponding to the interval between the telemeter and its maximum emission distance, by between 0 and 80 km. In a step 203, the integration value I is compared with a threshold value S1, fixed previously. If the integration value I is less than the threshold value S1, the echo of the target is not sufficient. It is then useless to activate the temporal detection and sub-steps 201 to 203 are repeated. In this case, either the direction of the telemetry axis or the time window is changed, or it is decided that there is no detectable target. Steps 202 and 203 are ensured by the spatial detector 10 and the switching means 14a, 14b.

If the integration value I is greater than the threshold value S1, this necessarily signifies that a target is present, the following steps of temporal detection will use frames comprising the signal arising from the target in addition to noise in the distance domain or sub-domain sought. The switching in a step 204 toggles to allow temporal detection. A group of K frames is acquired, this step comprising sub-steps 205 to 207.

In sub-step 205, the telemeter emits a new laser pulse by means of the emission device 2. In sub-step 206, a data frame $S_T$ is recorded during the return time window of the echo of the target corresponding to the distance domain or to the sub-domain sought; and optionally dated during a sub-step 206.1, as will be seen further on in the case of a mobile target. Depending on the characteristics of the system and the type of target that it is desired to detect, the direction of emission of the laser is considered to be stable on the target for a given number K of emissions. Sub-step 207 manages the acquisition of a group of K frames by repeating steps 205 to 206. These K frames are transmitted to the post-integration means 16 with a view to the post-integration step 208. According to this alternate (or sequential) mode of operation, all the frames arising from the temporal detector are taken into account for the post-integration, since selection has occurred upstream of the temporal detection.

In a step 209 ensured by the post-integration means 16, it is verified whether the result of the step 208 of post-integration of the K frames allows the publication of a distance with an acceptable probability of false alarm, stated otherwise whether the result of the post integration is above a second threshold value S2. If it is not possible to extract a distance through the calculation means 17, that is to say if the post-integration is not yet sufficient to publish the distance (=test of step 209 is negative), a new cycle takes place: the switching means relaunch a phase of spatial detection of the presence of the target and then K new frames are aggregated so as to be added to the post-integration before.

When the telemetry axis and the target are in motion with respect to one another, the information regarding presence of the target on the telemetry axis through the stringing together of steps 202 and 203 may optionally serve for the pursuit of the target.

To reduce the dead switching times, a variant of this mode of operation can be implemented. The cycle described hereinabove can be amended in the following manner, described in conjunction with FIG. 2b. The telemeter used is that described in conjunction with FIG. 1b. According to this variant, after the acquisition of a group A of frames and their post-integration, a second group B of frames is acquired.

Next, the selection means activate the spatial detection. If right from the first pulse the spatial detection detects the presence of the target, the group B is post-integrated. Otherwise the group B is rejected and the spatial detection continues. According to the result of the post-integration of the group A, if the distance is not obtained, there is no modification of the selection. There is modification of the selection to spatial detection position if the distance is obtained.

The spatial detection termed $1^{st}$ spatial detection is activated (steps 201', 202', 203'). When the presence of the target is affirmed by the spatial detection (test of step 204' is positive), there is acquisition of a group A of K frames of temporal detection (steps 205', 206.1', 206', 207'). The post-integration (step 208') of this group A is done. Either the distance can be published (since step test 209' is positive) and the spatial detection is then activated for a next telemetry (we start again at a $1^{st}$ spatial detection). If the test 209' for this group A is negative, a second group B of K frames is acquired (steps 205', 206.1', 206', 207'). This second group B is kept in memory. The switching means switch to the spatial detector (step 200). A spatial detection termed 2nd spatial detection is activated.

If this 2nd spatial detection confirms the presence of the target (positive test of step 203'), then this second group B of K frames of temporal detection is post-integrated while being aggregated with group A (step 208'). If the test 209' is positive subsequent to this post-integration of group B, the process is terminated with the publication of the distance. Otherwise, the switching means switch to the temporal detector and the process resumes at the acquisition of a group A of K frames (=group A temporal detection).

If the 2nd spatial detection does not confirm the presence of the target, the second group B of K frames of temporal detection is rejected. And the process continues for a new $1^{st}$ spatial detection of the target.

FIG. 2c presents a mode of operation of the telemeter when the spatial detection is simultaneous with the temporal detection, according to another embodiment. The telemeter used is that described in conjunction with FIG. 1c.

Optionally, the detection of the presence of a target at a distance below the minimum telemetry distance is activated, thereby making it possible to ensure the ocular safety of the device.

The measurement of the distance is done according to the process composed of cycles and described in FIG. 2c. In a step 301, the telemeter, according to one aspect of the invention, emits a laser pulse by means of the emission device 2. The temporal detection is activated simultaneously with the spatial detection. As long as a target is not located by spatial detection, the telemeter emits a new pulse.

Each pulse is optionally dated in a step 302, as will be seen further on.

In a temporal detection step 303, a data frame $S_T$ is recorded during the return time window of the echo of the target in the distance domain and the sub-domain sought, by means of the temporal detector 11. This data frame $S_T$ is potentially usable for the calculation of the distance between the target and the telemeter.

In a step 304 simultaneous with step 303 and ensured by means of the spatial detector 10, the spatial detection is in integration during the same return time window of the echo of the target in the distance domain or the sub-domain sought, so as to acquire an integration value I arising therefore from the same laser echo.

In a step 305 ensured by the discrimination means 14, the spatial information Ss arising from the spatial detection and the data frame $S_T$ arising from the temporal detection are associated for a subsequent processing of the data, since they arise from the same laser echo. They are for example associated in the form of a block of data comprising I, $S_T$ and the date of emission of the pulse.

Step 306 of analyzing the spatial information, also ensured by the discrimination means 14, concludes either that the echo of the target is not sufficient and in this case the data block acquired in the course of this iteration is rejected and the process resumes at step 301, or the echo of the target is sufficient and in this case we go to step 307: if I>S1, then $S_T$ and the date are communicated to the post-integration means 16.

Step 307 carries out the post-integration of the temporal frame $S_T$ with the data accumulated during the previous cycles. According to this simultaneous mode of operation, certain frames arising from the temporal detector are taken into account for the post-integration, but generally not all, since selection has occurred downstream of the temporal detection.

In a step 308 ensured by the post-integration means 16, it is verified that the signal obtained on completion of the step of post-integration of the frames allows the publication of a distance: the level of the signal extracted is compared with a threshold S2 above which the probability of false alarm is acceptable. If there is no distance publishable by the calculation means 17, the process is repeated from step 301 so as to aggregate a new frame until a distance is publishable. When the level of the signal extracted is greater than a threshold S2 above which the probability of false alarm is acceptable the process terminates with the publication of the distance.

Let us return to the example proposed in the preamble: for a gain of 10, the post-integration will pertain to only 100 valid frames i.e. 200 recorded frames instead of 400 frames when the telemeter is not used, according to one aspect of the invention.

Let us now deal with the case of a mobile target.

FIG. 3 represents the recording of 16 frames containing an echo of the target, the relative speed between the target and the telemeter being known and constant. A correction taking account of the date-stamping of the emission of the pulse corresponding to each frame and of the relative speed makes it possible to approach the nominal process to do the post-integration step. The distance obtained between the target and the telemeter will be valid only at a given instant. The distance obtained must therefore be dated. At any other moment a correction of the distance will have to be made by taking account of the relative speed.

If the speed is insufficiently known, several speed assumptions will have to be tested. The number of speed assumptions n corresponds to the relative speed v between the target and the telemeter multiplied by the time $\Delta t$ between the first and the last frame and divided by the distance resolution R, $n = v \cdot \Delta t / R$.

For example, assuming a duration between the first and the last frame of 1 second, a relative speed that may vary from $-20 \text{ m} \cdot \text{s}^{-1}$ to $+20 \text{ m} \cdot \text{s}^{-1}$ and a distance resolution of 2.5 m, a minimum of 16 speed assumptions will have to be tested.

Now, in order for the post-integration step to be effective the signal of the target must be summed across all the frames.

Consequently, for each speed assumption, a calculation of the distance between the telemeter and the target is carried out while taking account of the temporal label of the emission of each frame and of the chosen speed assumption.

The speed assumption whose calculation, subsequent to the post-integration step, gives the strongest signal is the most probable. The distance is provided together with a date and a probable speed.

Let us take the example of a telemeter at 100 Hz and of a target where, with respect to the detection limit in a single pulse, an ideal case of a gain of 10 is necessary. In the case where the target is properly centered for the duration of the telemetry, the probability of presence of the echo in each frame would be 1. The post-integration will be done in 100 frames. The duration between the first and the last frame is 1 second, the maximum relative speed+20 m·s$^{-1}$ and the distance resolution 2.5 m, the number of speed assumptions is 16, as we saw previously.

If the probability of presence of the echo of the target in a frame is ½, 400 frames are then necessary, as we saw previously, to obtain a signal-to-noise ratio identical to that obtained with a probability of presence of 1. The number of frames is therefore multiplied by a factor of 4.

The number of speed assumptions is also multiplied by 4, i.e. 64 because of the increase in the time between the first and the last frame which goes from 1 to 4 s.

Consequently, the number of operations to be carried out during the post-integration step is ultimately multiplied by a factor of 4×4=16.

In the case of the use of a telemeter, according to one aspect of the invention, the reckoning is the following. The number of frames to be recorded is multiplied by 2 because of the probability ½ of presence of the target in the frame, the number of frames to be processed in post-integration remains the same: 100 frames since all these frames contain the echo of the target and the number of speed assumptions is multiplied by two since the time between the first emission and the last emission is multiplied by 2. The number of operations to be carried out during the post-integration step is multiplied by a factor of 2 solely because of the doubling of the number of speed assumptions.

Thus, with the aid of this invention, in the case of a mobile target where the probability of presence of the echo of the target in a frame is 1/a, the acquisition time and the number of operations during the post-integration step, taking account of the assumptions regarding relative speed, is multiplied by a. Whereas without this invention, in the case of a mobile target where the probability of presence of the echo of the target in a frame is 1/a, the acquisition time is multiplied by a$^2$ and the number of operations during the post-integration step, taking account of the assumptions regarding relative speed, is multiplied by a$^4$.

|  | | | Unstable mobile target | |
| --- | --- | --- | --- | --- |
|  | Fixed target | Centered mobile target | Without invention | According to invention |
| Number of frames for post-integration | ∝ N | ∝ N | ∝ a$^2$ · N | ∝ N |
| Probability of presence of the target in the frame | 1 | 1 | 1/a | 1/a |
| Duration of acquisition | t | t | a$^2$ · t | a · t |
| Speed assumptions | 1 | V | a$^2$ · V | a · V |
| Number of operations | ∝ N | ∝ N · V | ∝ N · a$^2$ · a$^2$ · V | ∝ N · a · V |

The invention claimed is:

1. A telemeter for measuring a distance of a target, comprising:
   a laser pulse emitter,
   a receiver of the laser echoes backscattered by the target, comprising:
      a spatial detection device which comprises at least one photodiode set up as integrator and is able to provide a spatial signal, and
      a temporal detection device which comprises at least one photodiode coupled to a transimpedance circuit and is able to provide a temporal signal,
   means of processing of the spatial signal and of the temporal signal, comprising a unit for calculating the distance of the target, the temporal signal being in the form of one or more data frames which is the recording of data detected over a predetermined duration;
   wherein the means of processing comprise:
      means of post-integration of temporal signals, linked at output to the unit for calculating the distance of the target,
      linked to the spatial detection device and to the temporal detection device, a selection means for selecting the temporal signals to be transmitted to the means of post-integration, as a function of the spatial signal.

2. The telemeter as claimed in claim 1, wherein the means for selecting the temporal signals comprise a switching control linked at output to the temporal detection device via a switch, and linked at input to the spatial detection device and able to switch the temporal detection device via the switch as a function of the spatial signal, and the means of post-integration are linked at input to the temporal detection device.

3. A method for measuring the distance of a target with a telemeter as claimed in claim 2, the method comprising the following sequential steps:
   a spatial detection step comprising a first sub-step of emission of a laser pulse by the laser pulse emitter, a second sub-step of detecting a spatial signal SS corresponding to a laser echo of said laser pulse and of acquiring a value I of integration of spatial signal SS, and when the value I is below a predetermined threshold S1, the spatial detection step is repeated,
   otherwise a target then having been detected, a temporal detection step is implemented comprising a third sub-step of emission of other laser pulses by the laser pulse emitter, and a fourth sub-step of acquiring a temporal signal ST in the form of data frames, corresponding to laser echoes of said other laser pulses,
   a step of post-integration of the data frames of the temporal signal ST obtained during the temporal detection step.

4. The method as claimed in claim 3, further comprising a step of temporal labeling of the data frames prior to the post-integration step.

5. The method as claimed in claim 3, in which the target to be telemetered is mobile.

6. The method as claimed in claim 3, in which the target to be telemetered is mobile and the steps are repeated for various assumptions of relative speed between the target and the telemeter.

7. The telemeter as claimed in claim 2, wherein the switching control is linked to the means of post-integration.

8. A method for measuring the distance of a target with a telemeter as claimed in claim 7, the method comprising the following sequential steps:
- a step of first spatial detection comprising a first sub-step of emission of a first laser pulse by the laser pulse emitter, a second sub-step of detecting a first spatial signal SS corresponding to a laser echo of said first laser pulse and of acquiring a value I of integration of the first spatial signal SS, and when the value I is below a predetermined threshold S1, said first and second sub-steps are repeated,
- otherwise a target then having been detected, a first temporal detection step is implemented comprising a third sub-step of emission of first other laser pulses by the laser pulse emitter, and a fourth sub-step of acquiring a first temporal signal ST in the form of data frames group A, corresponding to laser echoes of said first other laser pulses,
- a step of post-integration of group A of data frames of first temporal signal ST obtained during the first temporal detection step,
- a second temporal detection step is implemented comprising a fifth sub-step of emission of second other laser pulses by the laser pulse emitter, which differ from the first other laser pulses, a sixth sub-step of acquiring a second temporal signal ST in the form of data frames group B, corresponding to laser echoes of said second other pulses, and a seventh sub-step of placing data frames group B in memory,
- a step of second spatial detection comprising a eighth sub-step of emission of a second laser pulse by the laser pulse emitter, a ninth sub-step of detecting a second spatial signal SS corresponding to a laser echo of said second laser pulse and of acquiring a value I of integration of the second spatial signal SS, when the value I is above a predetermined threshold S1, the spatial detection being confirmed, a step of post-integration of the data frames group B,
- and then acquisition of a new group A of data frames, and when the value I is below a predetermined threshold S1, the method is repeated at said step of first spatial detection.

9. The method as claimed in claim 8, further comprising a step of temporal labeling of the data frames prior to the post-integration step.

10. The method as claimed in claim 8, in which the target to be telemetered is mobile.

11. The method as claimed in claim 8, in which the target to be telemetered is mobile and the steps are repeated for various assumptions of relative speed between the target and the telemeter.

12. The telemeter as claimed in claim 1, in which the means for selecting the temporal signals are discrimination means linked at input to the spatial detection device and to the temporal detection device and at output to the means of post-integration.

13. A method for measuring the distance of a target with a telemeter as claimed in claim 12, the method comprising the following steps:
- a spatial detection step comprising a first sub-step of emission of a laser pulse by the laser pulse emitter, a second sub-step of detecting a spatial signal SS corresponding to a laser echo of said laser pulse and of acquisition of a value I of integration of the spatial signal SS by the selection means and a simultaneous third sub-step of detecting a temporal signal ST corresponding to the same laser echo of said laser pulse,
- when the value I is below a predetermined threshold S1, the spatial detection step is repeated,
- otherwise a target then having been detected, a step of post-integration of data frames corresponding to temporal signal ST, by the means of post-integration.

14. The method as claimed in claim 13, further comprising a step of temporal labeling of the data frames prior to the post-integration step.

15. The method as claimed in claim 13, in which the target to be telemetered is mobile.

16. The method as claimed in claim 13, in which the target to be telemetered is mobile and the steps are repeated for various assumptions of relative speed between the target and the telemeter.

17. The telemeter as claimed in claim 1, in which the means of processing comprise means of temporal labeling of the data frames.

18. The telemeter as claimed in claim 1, in which the laser pulse emitter has a direction of emission and the receiver has a direction of reception, and the telemeter further comprising a device for aligning the direction of emission and the direction of reception.

19. The telemeter as claimed in claim 1, in which the laser pulse emitter comprises means for adapting the divergence and for collimating a laser beam at infinity.

20. The telemeter as claimed in claim 1, further comprising means for detecting a presence of a target for distances less than a minimum telemetry distance, the means for detecting being adapted for deactivating operation of the laser pulse emitter and for ensuring ocular safety of the device from a zero distance.

21. The telemeter as claimed in claim 1, further comprising means for orienting a telemetry axis.

22. The telemeter as claimed in claim 1, further comprising means for measuring deviometry between a telemetry axis and a position of the target, the means for measuring being connected to the spatial detection device.

23. A method for measuring the distance of a target with a telemeter as claimed in claim 1, the method comprising:
- a spatial detection step comprising a first sub-step of emission of a laser pulse by the laser pulse emitter, a second sub-step of detecting a spatial signal SS and of acquiring a value I of integration of spatial signal SS,
- a temporal detection step comprising a third sub-step of emission of laser pulses by the laser pulse emitter, and a fourth sub-step of acquiring a temporal signal ST in the form of data frames,
- a step of post-integration of the data frames of temporal signal ST as a function of the spatial signal SS, and
- when the result of the post-integration step is above a threshold, a step of calculating the distance.

24. The method as claimed in claim 23, further comprising a step of temporal labeling of the data frames prior to the post-integration step.

25. The method as claimed in claim 23, in which the target to be telemetered is mobile.

26. The method as claimed in claim 23, in which the target to be telemetered is mobile and the steps are repeated for various assumptions of relative speed between the target and the telemeter.

* * * * *